United States Patent
Powell, II et al.

[11] Patent Number: 6,084,931
[45] Date of Patent: Jul. 4, 2000

[54] SYMBOL SYNCHRONIZER BASED ON EYE PATTERN CHARACTERISTICS HAVING VARIABLE ADAPTATION RATE AND ADJUSTABLE JITTER CONTROL, AND METHOD THEREFOR

[75] Inventors: Clinton C. Powell, II, Lake Worth; James M. Keba, Wellington; James R. Webster, Boynton Beach, all of Fla.

[73] Assignee: Motorola, Inc., Schaumburg, Ill.

[21] Appl. No.: 08/962,267

[22] Filed: Oct. 31, 1997

[51] Int. Cl.[7] ........................................................ H04L 7/00
[52] U.S. Cl. ............................ 375/355; 375/293; 375/371
[58] Field of Search ...................................... 395/294, 317, 395/354, 355, 360, 364, 393, 371, 293; 370/503; 455/260

[56] References Cited

U.S. PATENT DOCUMENTS

| | | | |
|---|---|---|---|
| 4,975,927 | 12/1990 | Yoshida | 375/235 |
| 5,208,833 | 5/1993 | Erhart et al. | 375/294 |
| 5,222,079 | 6/1993 | Rasor | 375/344 |
| 5,943,378 | 8/1999 | Keba et al. | 375/373 |

FOREIGN PATENT DOCUMENTS 2253122A 8/1992 United Kingdom ............ H04L 27/22

*Primary Examiner*—Stephen Chin
*Assistant Examiner*—Chieh M. Fan
*Attorney, Agent, or Firm*—James A. Lamb

[57] ABSTRACT

A symbol synchronizer (10) for use in a communication device. The symbol synchronizer (10) comprises a sampling circuit (100) which samples the demodulated signal at a plurality of sampling events for each symbol period to generate three sample values at each sampling event. An eye pattern detector circuit (200) generates eye pattern characteristic information based on the three sample values, and outputs a symbol pulse in response to detecting eye pattern characteristic information consistent with a symbol center. A synchronization noise mask circuit (400) filters symbol pulses that occur during a predetermined period of time after a first symbol pulse is detected for each symbol period. A synchronization adjust circuit (500) generates a synchronization pulse during each symbol period at a particular instant of time during the symbol period based on a history of the occurrences of symbol pulses for a current symbol period and for prior symbol periods.

27 Claims, 10 Drawing Sheets

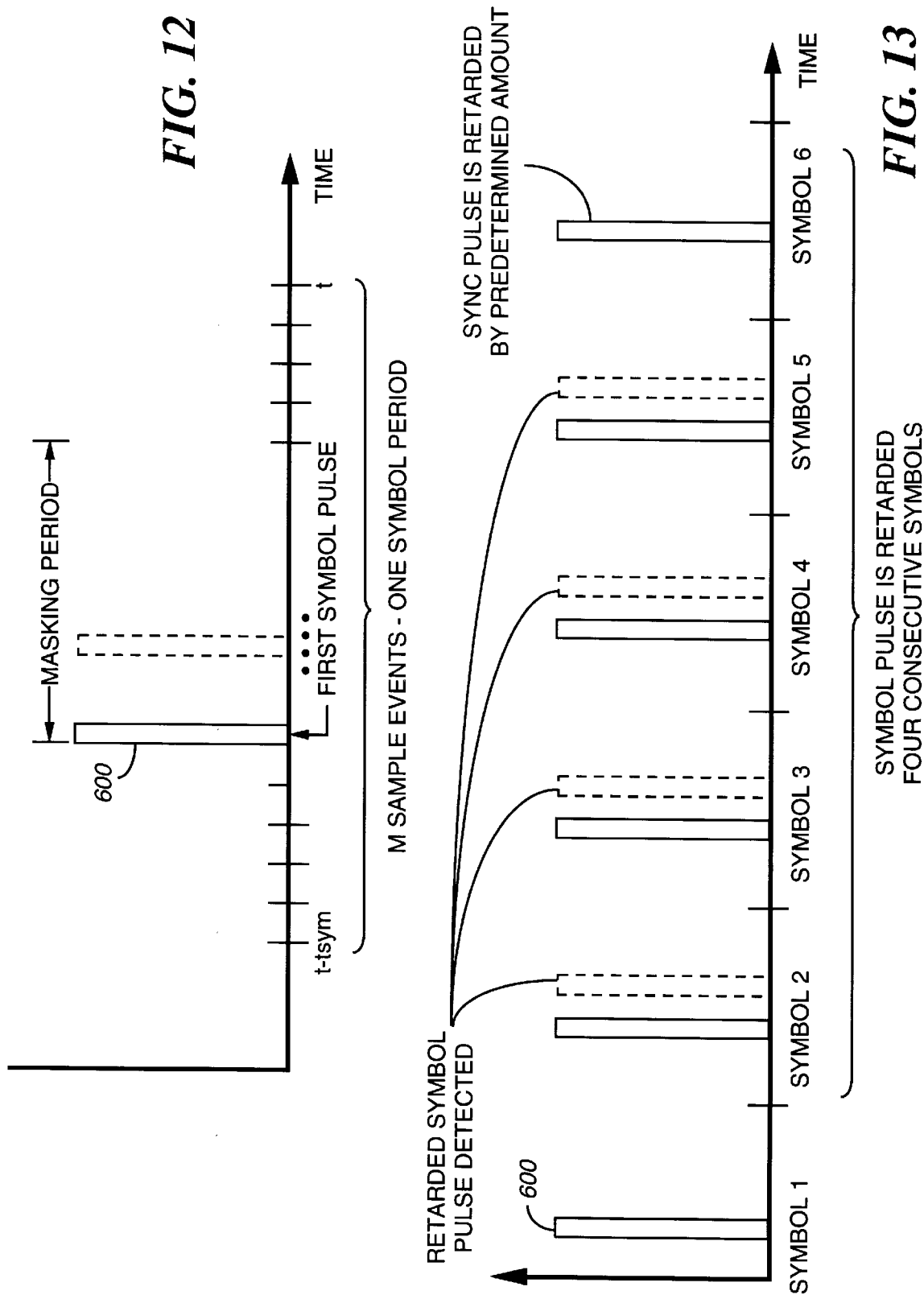

SYMBOL SYNCHRONIZER BASED ON EYE PATTERN CHARACTERISTICS HAVING VARIABLE ADAPTATION RATE AND ADJUSTABLE JITTER CONTROL, AND METHOD THEREFOR

FIELD OF THE INVENTION

The present invention is directed to a communication device, such as a selective call receiver (pager), and more particularly to a symbol synchronizer for determining a center of a symbol in a demodulated signal.

BACKGROUND OF THE INVENTION

Communication devices, such as selective call receivers, are designed to respond to received digital information. Intersymbol interference is often introduced when the digital information is modulated for transmission. To recover the digital information, it is necessary to locate the center of a symbol of the demodulated signal in order to precisely determine the digital data corresponding to a level of the demodulated signal.

The conventional technique of synchronizing to the center of a symbol involves detecting edges of transitions of the demodulated signal. Symbol synchronization based on edge detection is adequate for most applications, though there is room for improvement. In particular, when the communication device operates in a simulcast system in which multiple transmitters transmit simultaneously in a coverage area, there is a significant degradation of the symbol synchronization accuracy using edge detection techniques.

Accordingly, a symbol synchronizer is needed for synchronizing to symbols in a demodulated signal in which the center of a symbol is determined by detecting "eye pattern" characteristics of the demodulated signal.

BRIEF DESCRIPTION OF THE DRAWINGS

FIG. 12 is a timing diagram showing the operation of the synchronization noise mask circuit.

FIG. 13 is a timing diagram showing the operation of the synchronization adjust circuit.

DESCRIPTION OF A PREFERRED EMBODIMENT

Figure 1:
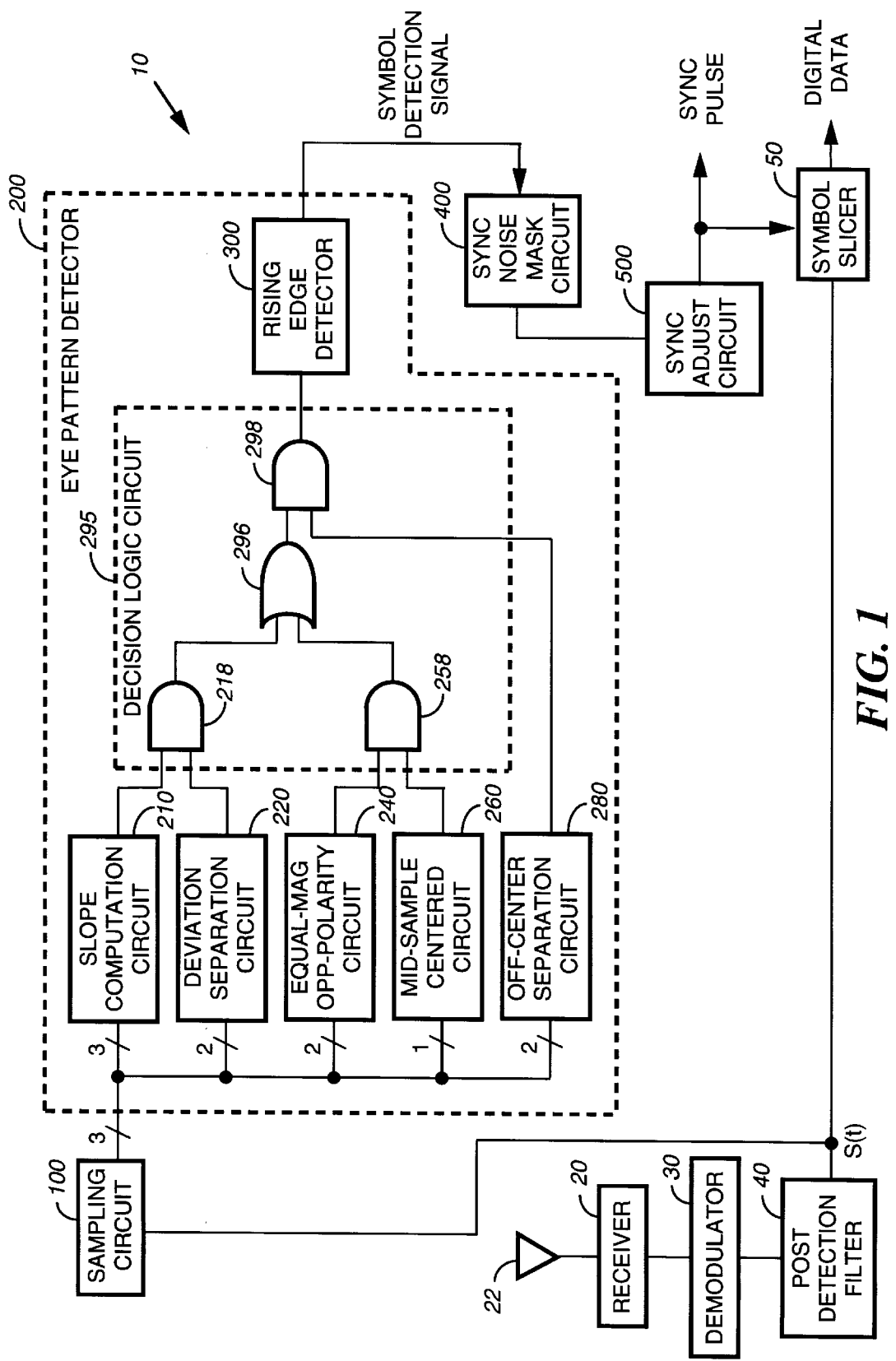
FIG. 1 is a block diagram showing the symbol synchronizer according to the present invention, and associated relevant receiver circuitry.

Referring first to FIG. 1, the symbol synchronizer is generally shown at reference numeral 10 and comprises a sampling circuit 100, an eye pattern detector 200, a synchronization (sync) noise mask circuit 400, and a synchronization adjust circuit 500. The symbol synchronizer 10 is for use in a communication device which receives multi-level frequency modulated (FM) signals. In the communication device, a receiver 20 is provided which receives signals detected by an antenna 22. The receiver 20 is connected to a demodulator 30 which demodulates the received FM signals to generate a demodulated signal having a plurality of levels representing the baseband modulation of the received (FM) signal. The demodulated signal is filtered by a post detection filter 40 which outputs a filtered demodulated signal, referred to hereinafter simply as the demodulated signal S(t). The symbol synchronizer is connected to a symbol slicer 50 and controls when the symbol slicer 50 slices the filtered demodulated signal S(t) in order to generate the digital data corresponding to the modulation levels of the demodulated signal S(t).

Figure 2:
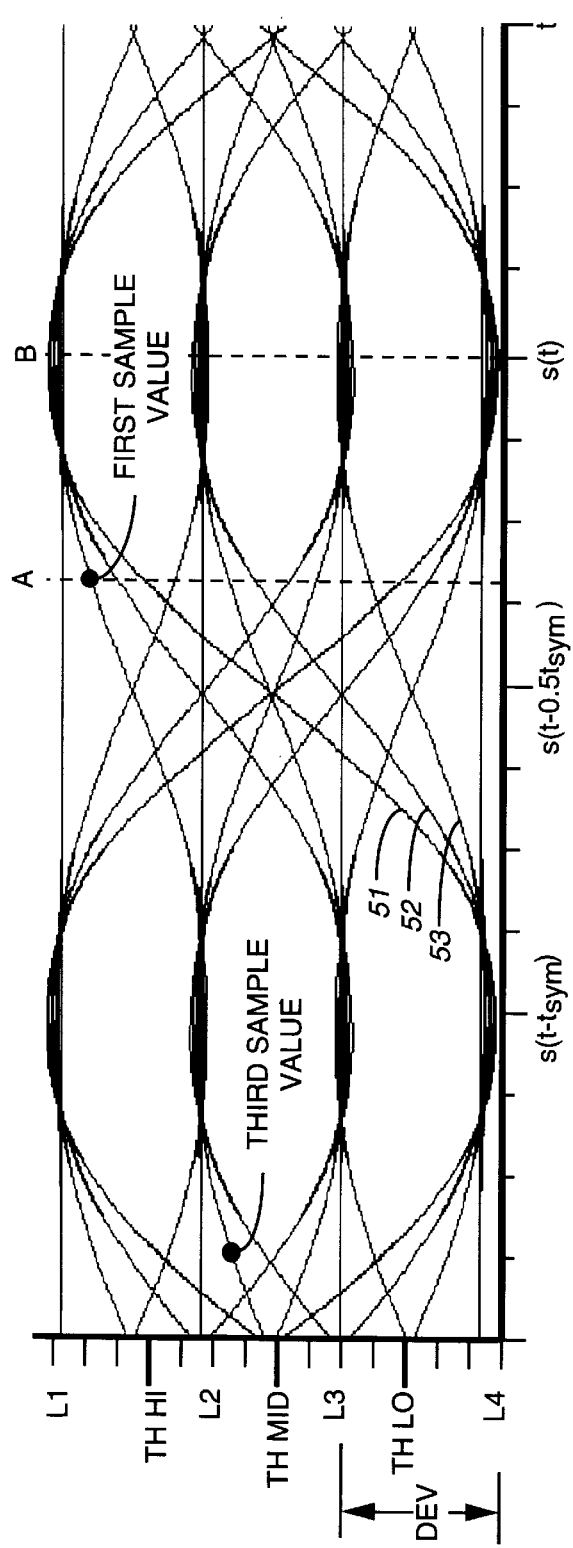
FIG. 2 is a graphical representation of an "eye pattern" for a demodulated four level frequency modulated signal.
Figure 3:
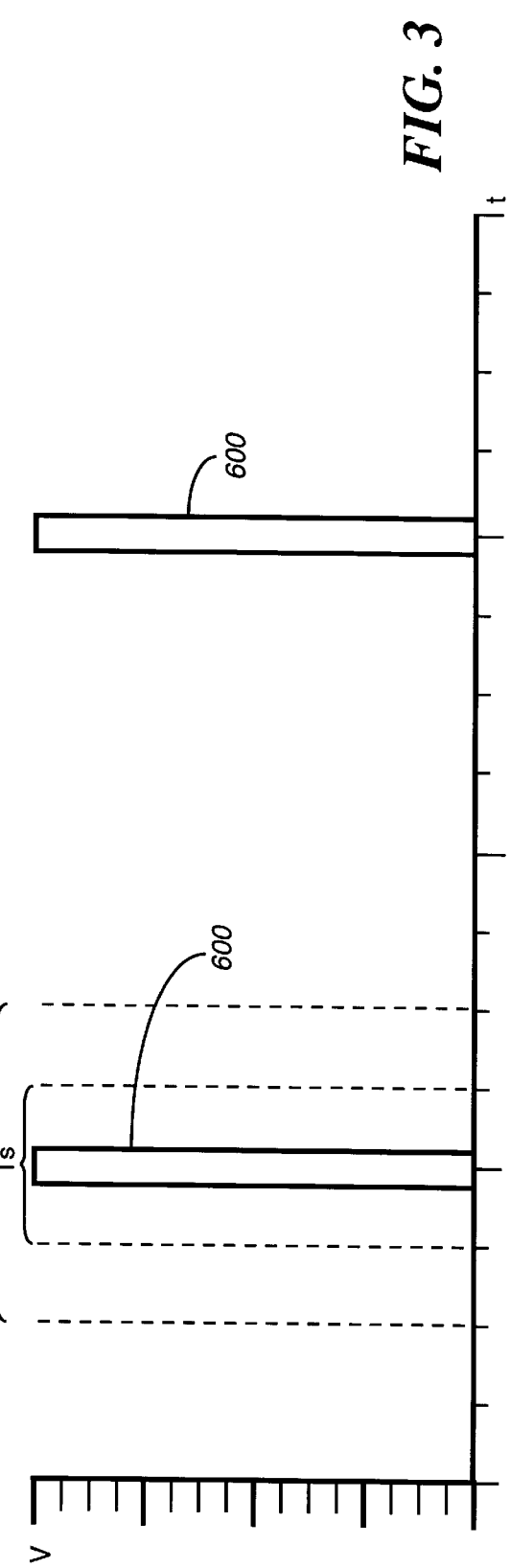
FIG. 3 is a timing diagram of synchronization pulses for the "eye pattern" of FIG. 2.

Turning to FIGS. 2 and 3, the symbol synchronizer 10 analyzes samples of the demodulated signal S(t) in order to detect a symbol center. In particular, the symbol synchronizer 10 examines the slope of the demodulated signal S(t) for transitions between various levels. For example, FIG. 2 illustrates a 4 level demodulated and filtered FM signal which has three different slopes (in magnitude) for transitions between the centers of symbols corresponding to the four possible levels. Slope S1 corresponds to the transition between the "outer" levels, levels L1 and L4. Slope S2 corresponds to the transition between level L4 and level L2 (or similarly between level L1 and level L3). Slope S3 corresponds to the transition between two adjacent levels, such as level L1 and level L2, or similarly between levels L2 and L3 and levels L3 and L4. The transitions between the symbol centers for any two levels of the four level signal S(t) shown in FIG. 2 is approximately equal to one of the three slopes S1, S2 or S3 (negative or positive). The levels L1, L2, L3 and L4 need not all correspond to positive values. For example, level L1 is +4800 Hz and level L4 is −4800 Hz, and level L2 is +1600 Hz whereas level L3 is −1600 Hz.

In general, for an M level modulated FM signal, there are M-1 different slopes that are identified in order to detect the eye pattern and synchronize to the center of the symbol. The following description is based on the example where the FM demodulated signal is a 4 level signal. However, it should be appreciated by those with ordinary skill in the art that the techniques and circuitry is applicable to an M level FM signal.

The symbol synchronizer 10 takes samples of the signal S(t). At each sampling event, it compares the sample values with each other and with predetermined parameters to generate eye pattern characteristic information, and determines whether the eye pattern characteristic information is consistent with a symbol center. To this end, the symbol synchronizer 10 takes three samples of the demodulated signal S(t). A first sample value s(t) at a first or current sample time t is taken. A second sample value $s(t-0.5t_{sym})$ is taken at a second sample time one-half of a symbol period $t_{sym}$ delayed from (prior to) the first sample time. This second sample value is also called a mid-sample value because it is taken midway between the first and third sample values. A third sample value $s(t-t_{sym})$ is taken at a third sample time one symbol period delayed from the first sample time. The symbol period ($t_{sym}$) is the time period for one symbol, and is known a priori, based on the expected symbol rate, etc.

FIG. 3 shows the generation of sync pulses 600 by the symbol synchronizer 10 according to the present invention. The time window Ts is the approximate period of time during which sync pulses 600 are generated by the symbol synchronizer 10. It is smaller than the time window Te during which sync pulses are generated by prior art edge detection techniques. That is, as shown in FIG. 3, the sync pulses 600 generated on the basis of eye pattern characteristic information have a "tighter deviation" than the deviation of sync pulses generated by edge detection techniques.

Referring back to FIG. 1, the eye pattern detector 200 of the symbol synchronizer 10 includes several circuits used to determine eye pattern characteristics of the demodulated signal S(t). These circuits are based on a fundamental equation:

$$\{[s(t)+s(t-t_{sym})]\times\tfrac{1}{2}\}=s(t-0.5t_{sym}).$$

For an M-level demodulated signal S(t), this equation can be written as a series of equations that govern the relationships between the three samples of the signal S(t) noted above. These equations are:

$$\{[s(t)+s(t-t_{sym})]\times\tfrac{1}{2}\}(1\pm err_1)=s(t-0.5t_{sym});$$

$$s(t-0.5t_{sym}) \neq s(t)(1\pm err_2) \text{ or } s(t-t_{sym})(1\pm err_2);$$

$$s(t) \neq s(t-t_{sym})(1\pm err_3);$$

where $err_1$, $err_2$ and $err_3$ are error tolerances which allow for variances in the relationships, and are determined a priori based on expected noise variance of the demodulated signal, degree of numerical precision in processing circuitry, clock adjustment, latency requirements, tracking of various channel conditions, and other parameters known to those with ordinary skill in the art.

Given a specific receiver implementation, certain modulation level ranges are known for the equivalent time domain voltages or their digital equivalents. As an example, for a 4 level FM signal formatted in accordance with Motorola's FLEX™ protocol technology, the separation between adjacent modulation levels is known with reasonable certainty. For any multi-level signalling scheme, the separation is a predetermined deviation value hereinafter called DEV. Similarly, there is a DC average value of demodulated multi-level signal which is an average value associated with the demodulated signal, called AVG.

In some applications automatic frequency control (AFC) or direct current (DC) offset compensation is applied to the demodulated signal before it is processed by the symbol synchronizer. As a result, the average value AVG is set to 0.

For a 4 level demodulated signal, the equations noted above can be rewritten as:

$$\{[s(t)+s(t-t_{sym})]\times 1/2\}(1\pm err_1)=s(t-0.5t_{sym}) \quad (A)$$

$$|s(t)-s(t-t_{sym})|=(1\pm err_2)(DEV,2\times DEV,3\times DEV) \quad (B)$$

$$|s(t)-AVG|>\tfrac{1}{2}DEV(1-err_3) \quad (C)$$

$$|s(t-t_{sym})-AVG|>\tfrac{1}{2}DEV(1-err_4) \quad (D)$$

$$s(t)=-s(t-t_{sym})(1\pm err_5) \quad (E)$$

$$|s(t-0.5t_{sym})-AVG|<DEV(err_6) \quad (F)$$

where $err_1 - err_6$ are error tolerances determined based on the various information described above. Equation B can be generalized for an M-level demodulated signal where the comparison is made with each of $1 \times DEV, 2 \times DEV, \ldots, (M-1) \times DEV$. The Boolean expression (AB+EF)CD is used to adjust the timing of the sync pulse delivered to the symbol slicer 50. These series of equations can be implemented in many ways, such as by hardware circuits, a digital signal processor, computer software, microprocessor instructions, etc. FIGS. 5–9 show hardware circuits for implementing these equations. However, those with ordinary skill in the art will appreciate that other methods, such as those mentioned, are equally suitable. All of the circuits shown as part of the symbol synchronizer 10 can be integrated onto a single application specific integrated circuit (ASIC), together with other signal processing functionalities.

Equation A determines whether the mid-sample value $s(t-0.5t_{sym})$ is an approximate arithmetic average of the first and third samples values s(t) and $s(t-t_{sym})$, respectively. Equation B determines whether the difference between the first and third sample values s(t) and $s(t-t_{sym})$ is approximately equal to a multiple of the predetermined deviation value DEV. Equations C and D determine whether the first and third sample values s(t) and $s(t-t_{sym})$ are at least 0.5×DEV from the predetermined average value AVG. Equation E determines if the first and third sample values are approximately the same magnitude and opposite in polarity. Equation F determines if the second sample value is within a certain range of the average value AVG. Equation ABCD detects when the first and third sample values correspond to symbols which are different in magnitude and opposite in phase. Equation CDEF determines when the sample values correspond to symbols which are the same magnitude but are opposite in phase.

The eye pattern detector 200 comprises a slope computation circuit 210 which performs the function of equation (A), a deviation separation circuit 220 which performs the function of equation (B), an equal-magnitude (equal-mag) opposite polarity (opp-polarity) circuit 240 which performs the function of equation (E), a mid-sample centered circuit 260 which performs the functions of equation (F) and an off-center separation circuit 280 which performs the functions of equations (C) and (D). The output of these circuits consists of eye pattern characteristic information which is processed by a decision logic circuit 295. The decision logic circuit 295 consists of combination logic circuits to detect when the eye pattern characteristic information is indicative of a symbol center for each sampling event, and generates an output signal representative thereof.

The decision logic circuit 295 comprises an AND gate 218, an AND gate 258, an OR gate 296 and an AND gate 298. The outputs of the slope computation circuit 210 and of the deviation separation circuit 220 are connected to AND gate 218. Similarly, the outputs of the equal-magnitude opposite-polarity circuit 240 and of the mid-sample centered circuit 260 are connected to AND gate 258. The outputs of the AND gate 218 and of the AND gate 258 are connected to respective inputs of OR gate 296. The output of the OR gate 296 is connected to a first input of AND gate 298. The output of the off-center separation circuit 280 is connected to a second input of the AND gate 298. Finally, the output of the third AND gate 298 is connected to an input of a rising edge detector 300. The decision logic circuit 295 will output a pulse, indicating a detection of a symbol center, when the output signals of at least the slope computation circuit 210, deviation separation circuit 220 and off-center separation circuit 280 are high. Alternatively, the decision logic circuit 295 will output a pulse when the output signals of at least the equal-magnitude opposite-polarity circuit 240, mid-sample centered circuit 260 and off-center separation circuit 280 are high. The output signal of the off-center separation circuit 280 is a determining factor in either case. The decision logic circuit 295 implements the Boolean equation (AB+EF)CD to detect a combination of individual eye pattern characteristics indicative of a symbol center for each sampling event, and generates an output signal representative thereof.

Figure 4:
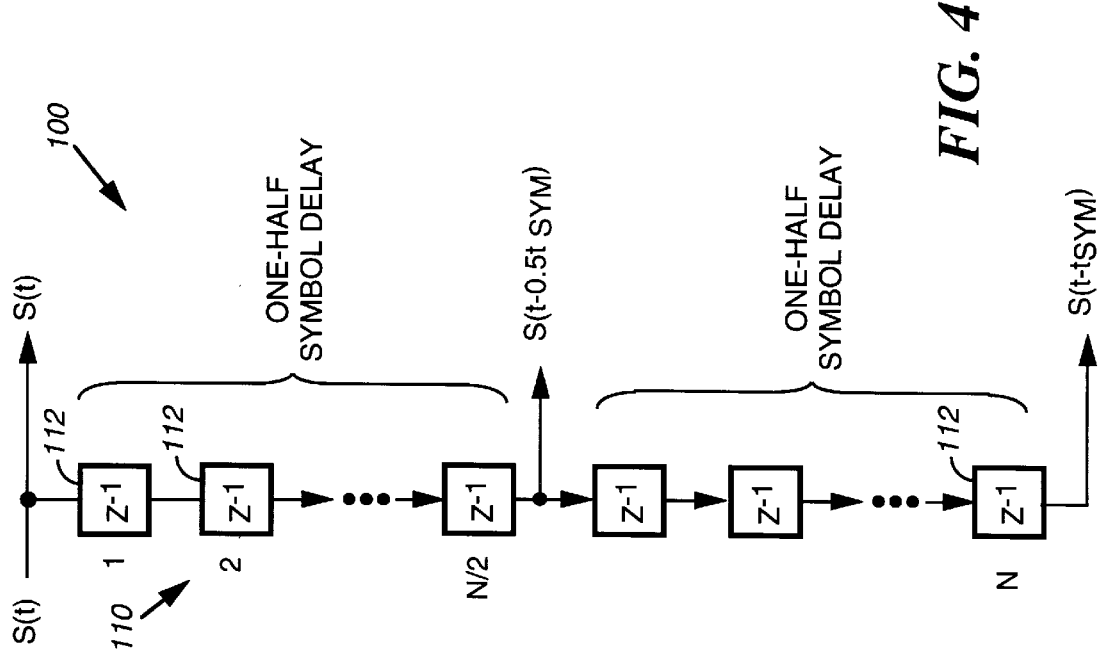
FIG. 4 is a block diagram of a sampling circuit forming a part of the symbol synchronizer according to the present invention.

The sampling circuit 100 samples the demodulated signal S(t) at predetermined sampling times and supplies sample values to each of the circuits connected thereto. Specifically, the sampling circuit generates and outputs the first sample value s(t), the second sample value or mid-sample value $s(t-0.5t_{sym})$ and the third sample value $s(t-t_{sym})$. The sampling circuit 100 is shown in more detail in FIG. 4, and comprises an N-stage delay block 110 comprising a plurality of delay elements ($Z^{-1}$) 112, where N is the number of samples to be taken per symbol period ($t_{sym}$). The mid-sample value $s(t-0.5t_{sym})$ is taken midway through the N-stage delay block, and the third sample value $s(t-t_{sym})$ is taken after the last delay element. One or more of the three samples are then used by the circuits in the eye pattern detector 200. The sampling circuit 100 generates the first, second and third sample values, respectively, at a plurality of sampling events during each symbol period tsym according to the number of samples (N) to be taken per symbol. For example, 24 sampling events per symbol period are taken. However, this number may vary for a particular data rate and multi-level signalling scheme.

The demodulated signal S(t) sampled by the sampling circuit 100 may be an analog demodulated signal, whose level corresponds to the modulation of the baseband signal, or a digital signal whose value corresponds to the modulation of the baseband signal. For example, the demodulator 30 shown in FIG. 1 is a digital demodulator. The output of the digital demodulator is sequence of digital words, each digital word representing (a number which in turn represents) the baseband modulation at a particular instant of time. The sampling circuit 100 can sample either an analog demodulated signal or digital demodulated signal.

In each of the circuits shown in FIGS. 5–9, there are some comparators which compare two quantities to determine if they are equal, and other comparators which compare two quantities to determine whether one is greater than another. Where a comparator is to determine whether two quantities are equal, this determination is made within a predetermined tolerance amount, as described hereinafter, to account for the tolerance values indicated in the foregoing equations. The comparators which test for a certain relational condition (greater than or less than) do not operate with predetermined tolerances in this manner.

Figure 5:
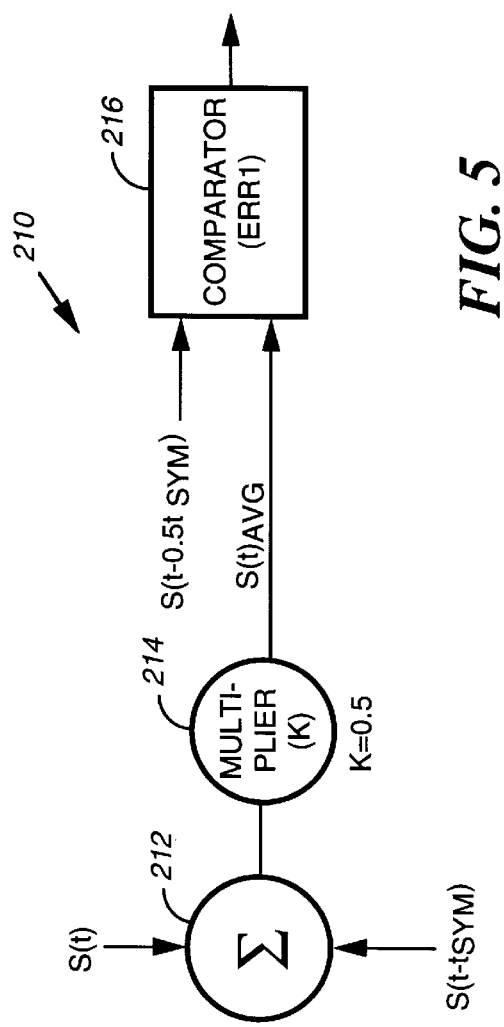
FIG. 5 is a block diagram of a slope computation circuit forming a part of the symbol synchronizer according to the present invention.

FIG. 5 illustrates the slope computation circuit 210, which comprises a summer 212, a multiplier 214 and a comparator 216. The summer 212 receives as inputs and adds together the first and second sample values s(t) and $s(t-t_{sym})$. The multiplier 214 multiplies the sum of the sample values s(t) and $s(t-t_{sym})$ by a factor K, where K=0.5. Thus, the output of the multiplier 214 is an average of the sample values s(t) and $s(t-t_{sym})$, called $S(t)_{avg}$ hereinafter. The comparator 216 compares the mid-sample value $s(t-0.5t_{sym})$ with $s(t)_{avg}$ to determine whether they are approximately equal (within the value of error tolerance $err_1$). If they are approximately equal, the comparator 216 generates an output signal comprising a pulse in response thereto. If they are not approximately equal, the comparator 216 does not generate a pulse. Functionally, the slope computation circuit 210 detects whether the mid-sample value falls approximately on a line between the first and third sample values. This indicates whether the slope of the line between the first and third sample values, those sample values separated by a symbol period tsym is indicative of a transition between modulation levels, and thus is useful in detecting a symbol center.

Figure 6:
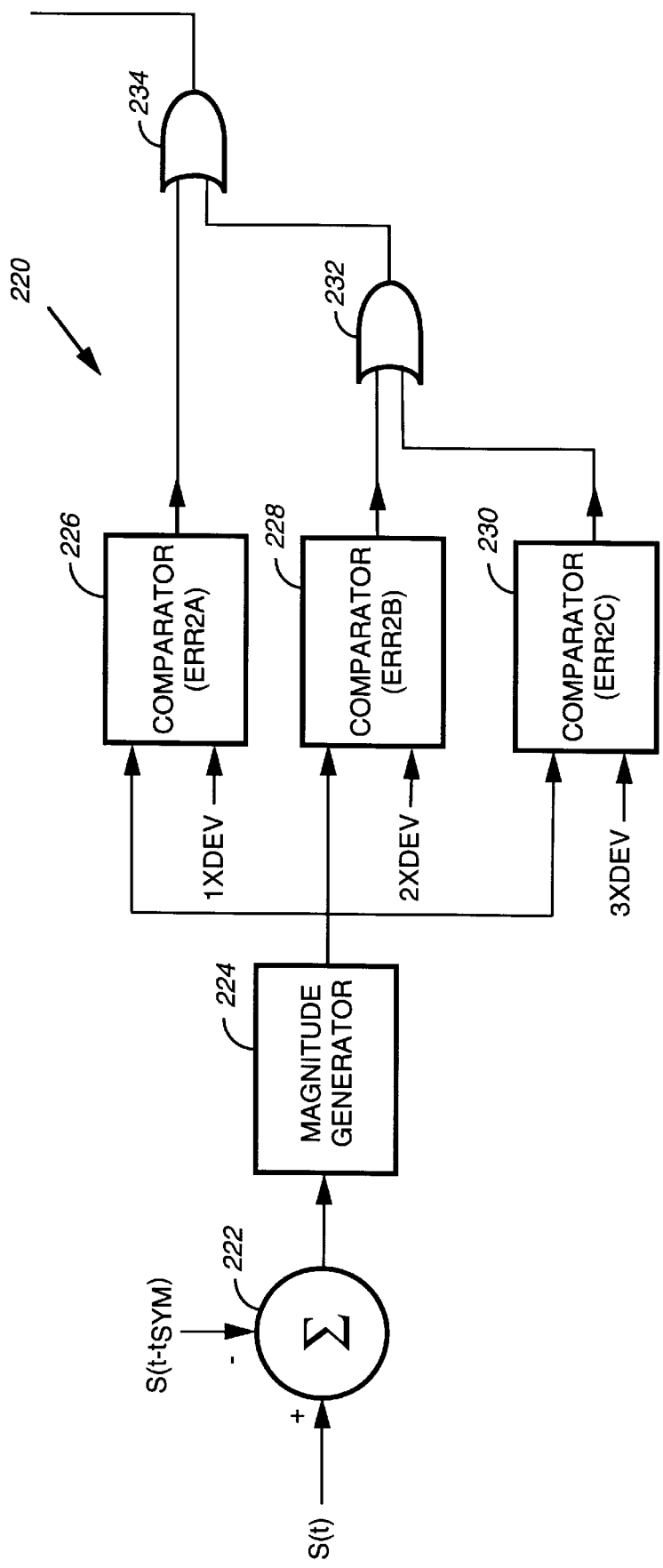
FIG. 6 is a block diagram of a deviation separation circuit forming a part of the symbol synchronizer according to the present invention.

FIG. 6 illustrates the deviation separation circuit 220. The deviation separation circuit determines whether the difference between the first sample value s(t) and the third sample value $s(t-t_{sym})$ is approximately equal to an integer multiple of the deviation value DEV. In general, a maximum magnitude or value of the integer is related to the number of possible level transitions (M−1) in the demodulated signal, wherein the value of the integer is between one and a maximum value (M−1). To this end, the deviation separation circuit comprises a summer 222 which receives the first sample value s(t) and subtracts from it the third sample value $s(t-t_{sym})$ to compute as output a difference. The magnitude generator 224 outputs the absolute value or magnitude of the difference. A plurality of comparators 226, 228 and 230 are provided to compare the magnitude of the difference with a different predetermined value. Specifically, when the demodulated signal S(t) is a 4 level signal, comparator 226 compares the magnitude of the difference with 1×DEV (within the value of the error tolerance $err_{2a}$), comparator 228 compares the magnitude of the difference with 2×DEV (within the value of the error tolerance $err_{2b}$), and comparator 230 compares the magnitude of the difference with 3×DEV (within the value of the error tolerance $err_{2c}$). The comparators 226, 228 and 230 each output a pulse when the magnitude of the difference is approximately equal to its corresponding comparison value (within the value of the associated error tolerance). The first OR gate 232 is connected to the outputs of the comparator 228 and of the comparator 230 and generates as output a pulse if either comparator 228 or comparator 230 are high. Similarly, a second OR gate 234 is connected to the output of the comparator 226 and to the output of the OR gate 232 and generates an output signal comprising a pulse if either the output of the comparator 226 or the output of the OR gate 232 is high.

To process information associated with a generalized M level demodulated signal, the deviation comparison circuit 200 comprises M−1 comparators, which compare the magnitude of the difference between the first sample value and the second sample value with 1×DEV, 2×DEV, 3×DEV, . . . , (M−1)×DEV.

Figure 7:
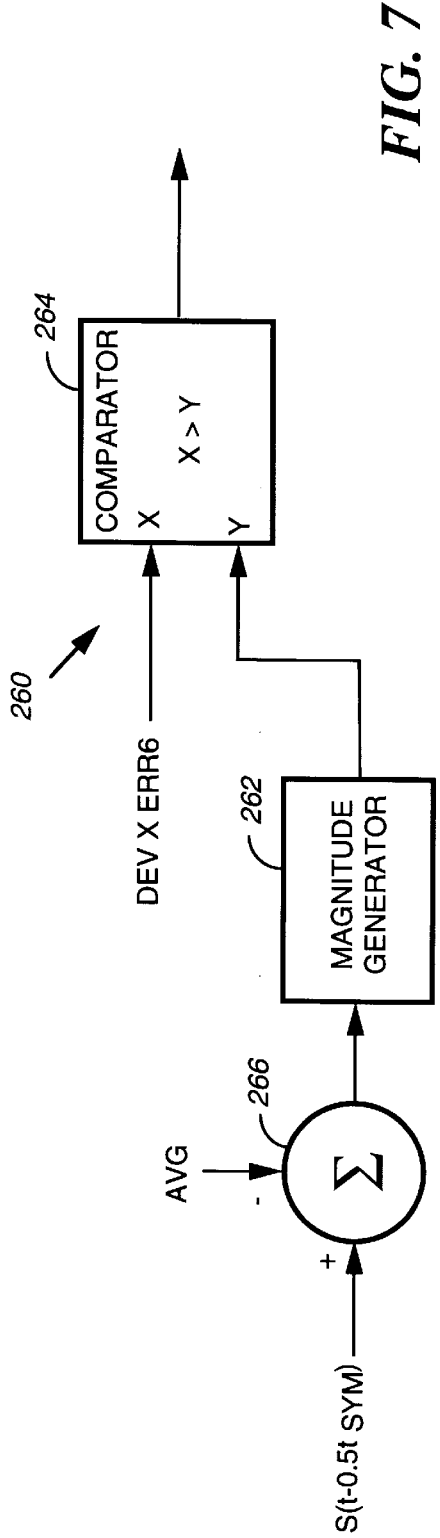
FIG. 7 is a block diagram showing a mid-sample centered circuit forming a part of the symbol synchronizer according to the present invention.

Turning to FIG. 7, the mid-sample centered circuit 260 is shown, which comprises a magnitude generator 262 and a comparator 264. The mid-sample centered circuit 260 determines whether a magnitude of the second sample value with respect to the predetermined average value is within a predetermined range of the deviation value DEV. The magnitude generator 262 computes the absolute value or magnitude of the difference between the second sample value $s(t-0.5t_{sym})$ and the average value AVG, that is, it computes the quantity [s(t−0.5$t_{sym}$)−AVG], and couples the magnitude of this quantity to one input of the comparator 264. The other input of the comparator 264 receives the quantity of the predetermined deviation value DEV multiplied by the error tolerance $err_6$. The comparator 264 generates an output signal comprising a pulse if the quantity DEV×$err_6$ is greater than the magnitude of the second sample value less the average value AVG.

Figure 8:
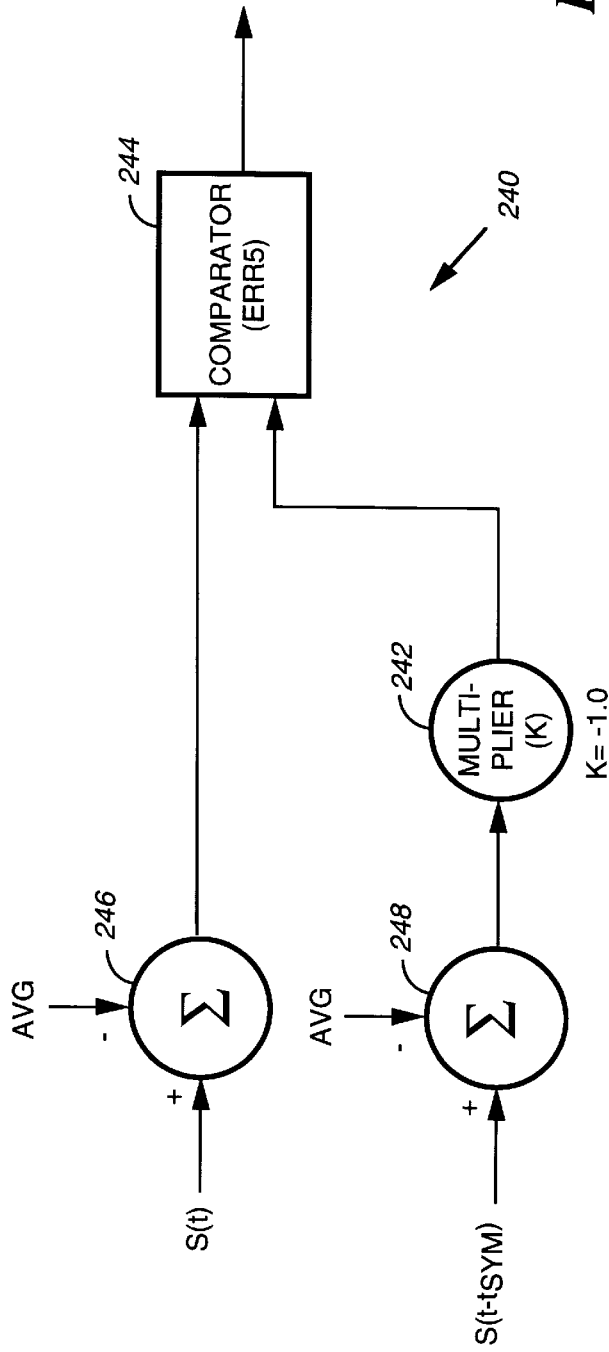
FIG. 8 is a block diagram showing equal-magnitude opposite-polarity circuit forming a part of the symbol synchronizer according to the present invention.

FIG. 8 illustrates the equal-magnitude opposite-polarity circuit 240. The equal-magnitude opposite-polarity circuit 240 compares the first sample value and the third sample value to detect if the first sample value and third sample value are approximately equal in magnitude and opposite in polarity with respect to the average value AVG of the demodulated signal. Specifically, it compares the quantity [s(t)−AVG] with the quantity [s(t−$t_{sym}$)−AVG] to determine if they are the same magnitude, but opposite in polarity. The quantity [s(t)−AVG] is connected to one input of a comparator 244. The quantity [s(t−$t_{sym}$)−AVG] is connected to a multiplier 242, which multiplies it by a constant K=−1.0. The comparator compares [s(t)−AVG] with −[s(t−$t_{sym}$)−AVG] and generates an output signal comprising a pulse when they are approximately equal (within a value determined by the error tolerance $err_5$).

Figure 9:
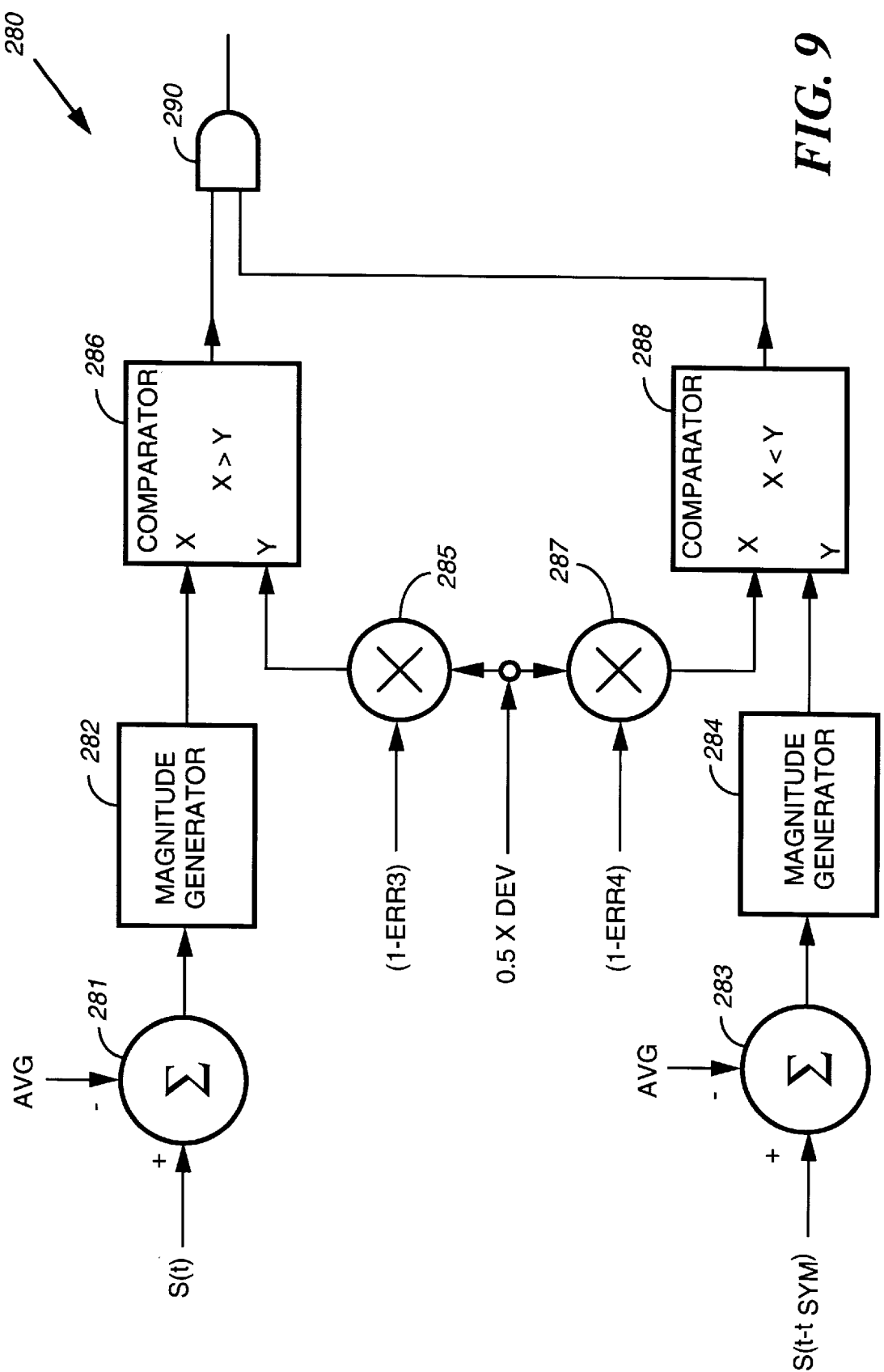
FIG. 9 is a block diagram of an off-center separation circuit forming a part of the symbol synchronizer according to the present invention.

FIG. 9 illustrates the off-center separation circuit 280. The off-center separation circuit 280 determines whether the first sample value and third sample value, each with respect to the average value AVG, are beyond (outside of) a predetermined range of one-half of the predetermined deviation value DEV. Specifically, it determines whether the magnitude of the quantity [s(t)−AVG] is beyond a predetermined range of one-half of the deviation value DEV and whether the magnitude of the quantity [s(t−$t_{sym}$)−AVG] is also beyond the predetermined range of one-half of the deviation value DEV. The off-center separation circuit 280 comprises a summer circuit 281 which computes the difference between the first sample value s(t) and AVG and which couples the result to the magnitude generator 282. Similarly, a summer circuit 283 computes the difference between the third sample value s(t−$t_{sym}$) and AVG and couples the result to the magnitude generator 284. The magnitude generator 282 computes the magnitude of [s(t)−AVG] and couples it to one input of the comparator 286 and magnitude generator 284 computes the magnitude of [s(t−$t_{sym}$)−AVG] and couples it to one input of the comparator 288. Comparator 286 compares the output of the magnitude generator 282 with the product [(1−$err_3$)(0.5×DEV)] and if the magnitude of [s(t)−AVG] is greater than [(1−$err_3$)(0.5×DEV)], it generates an output signal comprising a pulse. Similarly, comparator 288 compares the output of the magnitude generator 284 with the product [(1−$err_4$)(0.5×DEV)] and if the magnitude of [s(t−$t_{sym}$)−AVG] is greater than [(1−$err_4$)(0.5×DEV)], it generates an output signal comprising a pulse. An AND gate 290 ANDs together the output of the comparators 286 and 288, and if it detects a pulse from both comparators, it generates an output signal comprising a pulse.

With reference to FIGS. 1 and 2, the eye pattern detector 200 operates as follows. The first, second and third sample values for each sampling event are output by the sampling circuit 100. The three sample values output by the sampling circuit 100 for each sampling event are processed by the various circuits in the eye pattern detector 200. Whether a symbol pulse is generated in the symbol detection signal depends on the eye pattern characteristics detected by the eye pattern detector for each sampling event. Sampling events A and B are shown as an example in FIG. 2, and the output of each of the circuits of the eye pattern detector 200 at sampling event A and B will be described.

For sampling event A, any trace of the eye pattern (corresponding to the demodulated signal S(t) will not be detected as a symbol center. Consider, for example, the eye pattern trace where the first sample value s(t) is between level L1 and level L2 and the third sample value s(t−$t_{sym}$) is between level L2 and level L3 as indicated in FIG. 2. The output signal of the slope computation circuit 210 may not be high because the mid-sample value may not be approximately equal to the average of the first sample value and third sample value. The output signal of the deviation separation circuit 220 may be high because the separation between the first sample value and third sample value may be approximately equal to an integer (one) multiple of the deviation value DEV. The output of the AND gate 218 may be high due to the output signal of the slope computation circuit 210. Consequently, one input to the OR gate 296 may be high. The output signal of the equal-magnitude opposite-polarity circuit 240 will not be high because the first sample value and third sample value are not symmetric to each other with respect to the average value AVG (which corresponds to TH MID in the example of FIG. 2). The output signal of the mid-sample centered circuit 260 may be high because the second sample value may be less than 1×DEV from the AVG. Nevertheless, the output of the AND gate 258 will be low because the output signal of the equal-magnitude opposite-polarity circuit 240 is low. The output of the OR gate 296 may be high due to the output of the slope computation circuit 210. However, the output of the off-center separation circuit 280 will be low thereby causing the output of the AND gate 298 to be low. Thus, no symbol pulse will be generated by the rising edge detector 300.

It should be appreciated that the proper combination of eye pattern characteristics must be detected by the slope computation circuit 210, deviation separation circuit 220, equal-magnitude opposite-polarity circuit 240, mid-sample centered circuit 260 and off-center separation circuit 280, in order for the AND gate 298 to go high at a particular sampling event.

When the current sample event reaches sampling event B, the eye pattern detector 200 will output a symbol pulse. Sampling event B will likely correspond to a symbol center because for any transition of the demodulated signal S(t), the desired characteristics for an eye pattern opening exists and will be detected. For example, assuming the trace of the eye pattern is such that the first sample value at s(t) is at level L1 and the third sample value is at level L2. The output signal of the slope computation circuit 210 will be high because the mid-sample value is approximately equal to the average of the first sample value and the third sample. The output signal of the deviation separation circuit 220 will be high because the difference between the first and third sample values is approximately equal to 1×DEV. Thus, the output of the AND gate 218 will be high. However, the output signal of the equal-magnitude opposite-polarity circuit 240 will not be high because the first sample value and third sample value are not equal in magnitude. As a result, one input to the OR gate 296 will be low, though the output of the OR gate 296 will be high because the other input from AND gate 218 is high. The output signal of the off-center separation circuit 280 will be high because the magnitude of the first sample value minus AVG is greater than (0.5×DEV) and the magnitude of the third sample value minus AVG is greater than (0.5×DEV). Consequently, the output of the AND gate 298 will be high.

Referring back to FIG. 1, the rising edge detector 300 is connected to the output of the AND gate 298. It generates as output a symbol detection signal comprising a symbol pulse if, at the previous sampling event, the output of the AND gate 298 was low, and at the current sampling event, the output of the AND gate is high. Thus, the rising edge detector is responsive only to true rising edges in the output of the AND gate 298.

Figure 10:
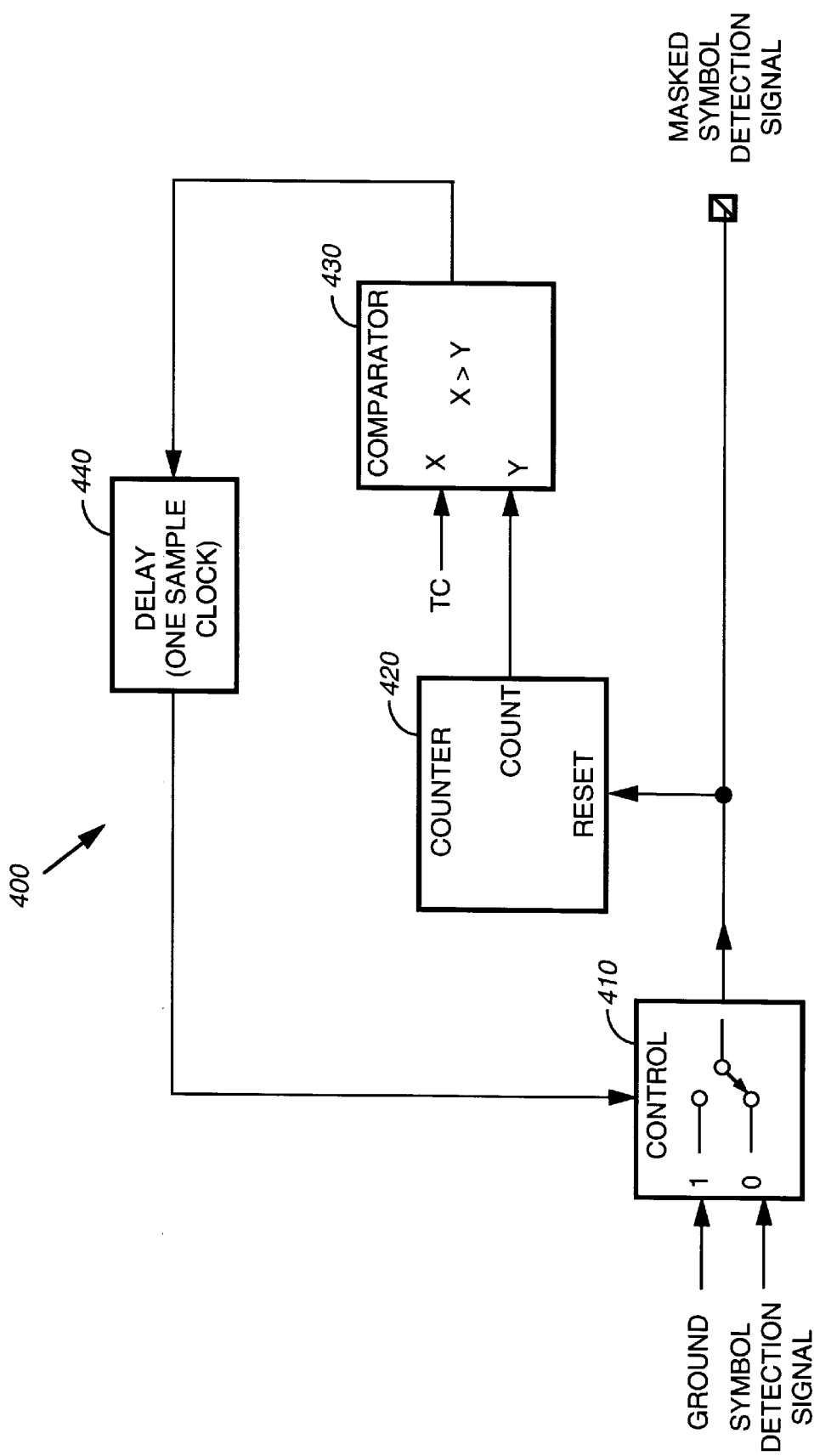
FIG. 10 is a block diagram of a synchronization noise mask circuit forming a part of the symbol synchronizer according to the present invention.

Turning to FIGS. 10 and 12, the sync noise mask circuit 400 will be described. The sync noise mask circuit 400 is a filter circuit which filters out symbol pulses in the symbol detection signal output by the eye pattern detector 200 so that only one symbol pulse is output for each symbol period. In particular, the sync noise mask circuit 400 masks symbol pulses that occur during a predetermined period of time after the first symbol pulse occurs for a symbol period. This reduces symbol to symbol (short term) sync pulse jitter under bad signalling conditions. The sync noise mask circuit 400 comprises a switch 410 having two inputs and an output. The output of the switch 410 is connected to the reset input of a counter 420. The count output of the counter 420 is connected to a threshold input of a comparator 430. A predetermined count value TC is connected to the other input of the comparator 420, and represents the masking period, i.e., the predetermined period of time after the first detected symbol pulse during which symbol pulses will be masked or filtered out. The predetermined count value TC is adjustable to adjust the jitter control of the sync pulse, but is typically less than a symbol period. The output of the comparator 430 is connected to a delay circuit 440. The delay circuit 440 delays the output of the comparator 430 by one sample clock (one sampling event) and is connected to the control input of the switch 410.

In operation, the sync noise mask circuit 400 receives as input the symbol detection signal output by the rising edge detector 300. The default position of the switch 410 is position 0, where the symbol detection signal is selected for output. After a symbol pulse is detected in the symbol detection signal, the counter 420 is triggered by the symbol pulse to reset to zero, which causes the output of the comparator 430 to go low (because the count value will be less than TC), which in turn causes the switch 410 to move to position 1, inhibiting further symbol detection signals from passing through the switch 410. When the count value of the counter 420 reaches the value of TC (corresponding to the time duration of the masking period), the output of the comparator 430 will go high, causing the switch 410 to move to position 0 (after a delay of one sample clock), and the process repeats.

Consequently, the symbol pulses in the symbol detection signal which occur during the masking period after the first symbol pulse will be masked, as shown by the symbol pulse in phantom in FIG. 12. The output of the sync noise mask circuit 400 is a masked symbol detection signal, which comprises only one symbol pulse per symbol period.

There are other ways of masking or filtering symbol pulses in the symbol detection signal. For example, an average of all of the symbol pulses that occur during a symbol period can be taken, so that one symbol pulse is output, having a phase which is an average of the phases of all (or a predetermined number) of the detected symbol pulses in a symbol period.

Figure 11:
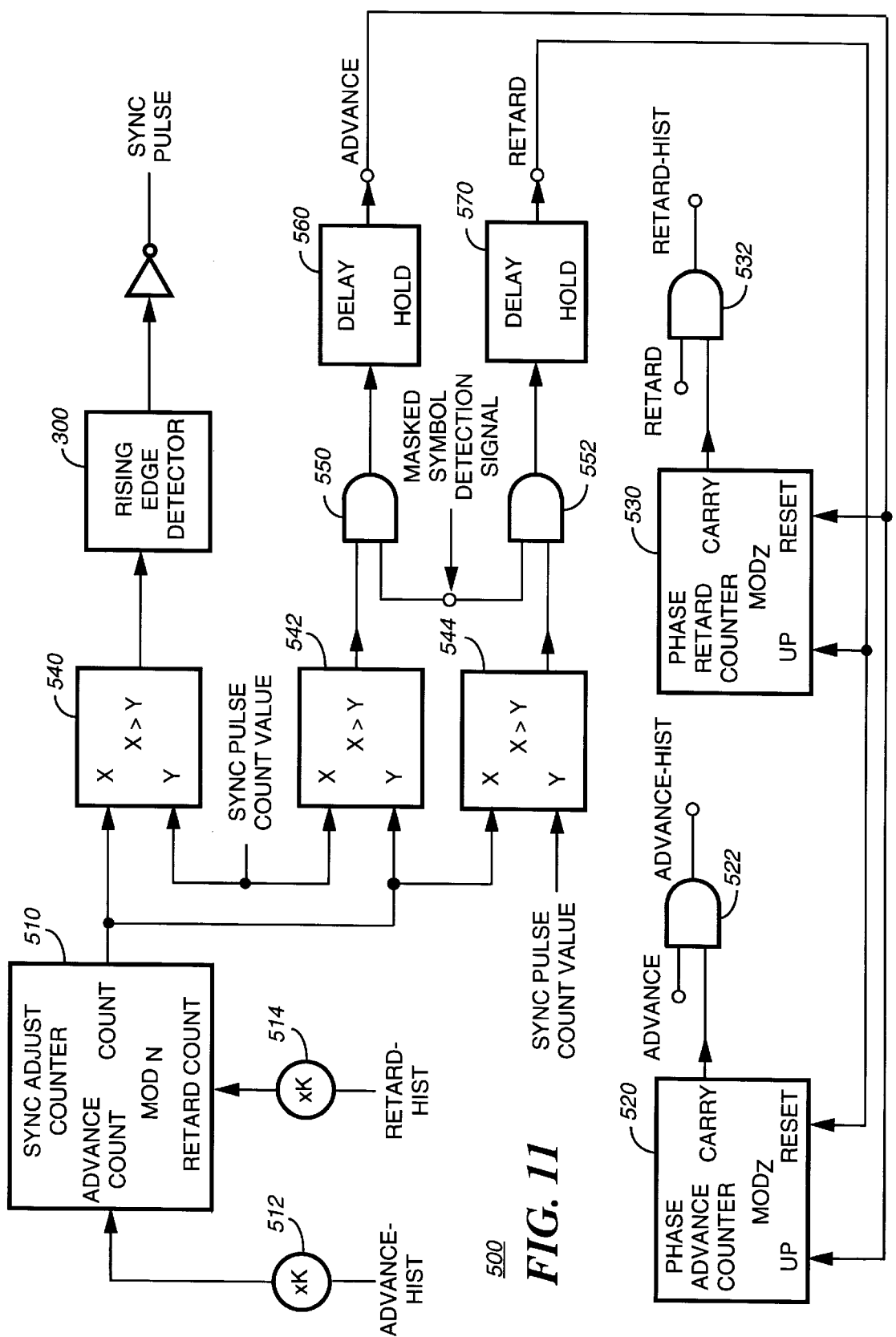
FIG. 11 is a block diagram of a synchronization counter and adjust circuit forming a part of the symbol synchronizer according to the present invention.

FIG. 11 illustrates the synchronization (sync) adjust circuit 500. The sync adjust circuit 500 controls generation of sync pulses in response to symbol pulses in the masked symbol detection signal to prevent advancing or retarding the sync pulse too quickly from one symbol period to the next. It also ensures that a sync pulse is generated for every symbol even when no pulse is received in the masked symbol detection signal from the sync noise mask circuit 400. The sync adjust circuit 500 changes the phase of a sync pulse, that is it advances or retards a sync pulse by an adjustable predetermined amount, in response to detecting an change in phase (advancement or retardation, respectively), of symbol pulses for an adjustable predetermined number of prior consecutive symbol periods. Thus, the adaptation rate (bandwidth) of the symbol synchronization is adjustable. This reduces long term sync pulse jitter. The sync adjust circuit 500 generates a sync pulse during each symbol period at a particular instant of time during the symbol period based on occurrences of a symbol pulse for a current symbol period and for prior symbol periods.

The sync adjust circuit 500 comprises a sync adjust counter 510 controlled by a phase advance counter 520 and a phase retard counter 530. The sync adjust counter 510 comprises an advance count input which causes it to increment the count in a single clock cycle by the value at the advance count input and a retard count input which causes it decrement the count in a single clock cycle by the value at the retard count input. When both the advance count input and retard count input are zero, the counter 510 increments by one (1) count each clock cycle. The counter 510 is a modulo (MOD) N counter that counts from 0 to N−1, and then starts again at 0. The value of N is set equal to the over-sampling rate (OSR) which is the number of samples to be taken per symbol period.

A multiplier 512 is connected between the advance count input of the sync adjust counter 510 and an advance-hist signal generated by the phase advance counter and a multiplier 514 is connected between the retard count input and the retard history signal generated by the phase retard counter. The count output of the sync adjust counter 510 is connected to one input of a first comparator 540. A sync pulse count value is connected to the threshold input of the comparator 540. The sync pulse count value is also connected to an input of a comparator 542 and 544. The sync pulse-count value represents the value that when reached by the sync adjust counter 510, causes the comparator 540 to generate a pulse, the rising edge of which is detected by the rising edge detector 300. The sync pulse count value is determined based on a relationship to the OSR, such that the sync pulse count value is equal to (0.5×OSR−1). For example, if the OSR is 24 (which is also the modulo count value for the sync adjust counter), then the sync pulse count value is 11. The count output of the sync adjust counter 510 is also connected to another input of the second comparator 542 and of the comparator 544.

The value of K for each of the multipliers 512 and 514 determines the adjustable predetermined amount or rate by which the sync adjust circuit 500 can advance or retard a sync pulse. This is referred to as the advance-retard rate (ARR).

The output of the comparator 542 is connected to an input of an AND gate 550 and the output of the comparator 544 is connected to an input of an AND gate 552. The masked symbol detection signal is connected to the other inputs of the AND gates 550 and 552. The output of the AND gate 550 is connected to a delay circuit 560 and the output of the AND gate 552 is connected to a delay circuit 570. The output of the delay circuit 560 is an advance signal and the output of the delay circuit 570 is a retard signal.

The phase advance counter 520 comprises an up count input, a reset input and a carry output. The up count input is connected to the advance signal and the reset input is connected to the retard signal. Similarly, the phase retard counter 530 comprises an up count input connected to the retard signal and a reset input connected to the advance input. The carry output of the phase advance counter 520 is connected to one input of an AND gate 522. The other input of the AND gate 522 is connected to the advance signal. The carry output of the phase retard counter 530 is connected to one input of an AND gate 532. The other input of the AND gate 532 is connected to the retard signal. The carry output of the phase advance counter 520 goes high when the count value reaches a modulo Z value (counts from Z−1 to 0), where Z is an integer representing a predetermined bandwidth adjustment (BWA). The BWA value represents the predetermined number of consecutive symbol periods for which an advancement or retardation of a masked symbol pulse must be detected before the sync pulse is advanced or retarded, respectively. The phase retard counter 530 is a modulo Z counter as well and operates in the same manner.

The functions of the phase advance counter 520 and of the phase retard counter 530 can alternatively be implemented in a single up/down counter.

The sync adjust circuit 500 adjusts to and eventually locks in on the symbol center of a demodulated signal. The rate at which the sync adjust circuit 500 adapts to changing signal conditions is variable depending on the value of Z, the value of K (ARR) in the multipliers 512 and 514 and the BWA set in the phase advance counter 520 and phase retard counter 530.

In operation, the sync adjust counter counts up 1 for each clock cycle. Eventually, the comparator 542 will detect when the count output of the sync adjust counter 510 is greater than the sync pulse count value and will output a pulse. The AND gate 550 outputs a pulse when the symbol pulse in the masked symbol detection signal occurs at a clock cycle (corresponding to a sampling event) in which the count output of the sync adjust counter is less than the sync pulse count value. When this occurs, the AND gate 550 issues pulse which is delayed one clock cycle to generate an advance signal. Eventually, the sync adjust counter 510 counts to N−1, and then starts counting over from 0. Each count cycle corresponds to a symbol period. An issuance of the advance signal is an indication that a symbol pulse in the symbol detection signal occurs before the count output of the sync adjust counter reaches the sync pulse count value, that is, that the symbol pulse is advanced with respect to the sync pulse count value. The phase advance counter counts the number of times the advance signal is issued and when the count transitions from Z−1 to zero, the AND gate 522 will issue a pulse in the advance-hist signal. The sync adjust counter 510 will then be caused to count up even quicker, according to the value of ARR. This will cause the count output of the sync adjust counter to increase quicker so that it will exceed the sync pulse count value, causing the sync pulse to be advanced by a number of sampling events based on the value of ARR.

The manner in which the sync pulse is retarded is similar. The phase retard counter counts the number of times that the retard signal is issued, indicating that the sync pulse count value is less than the count output of the sync adjust counter 510 when a symbol pulse is detected in the masked symbol detection signal. This indicates that the symbol pulse is retarded with respect to the sync pulse count value. The phase retard counter 530 will count the number of times that the retard signal is issued, and once the count transitions from Z−1 to zero, the AND gate 532 will output a pulse in the retard hist signal. A pulse in the retard-hist causes the sync adjust counter to decrement the count by a predetermined number of sampling events, based on the value of ARR. Consequently, the sync pulse will be delayed a corresponding number of sampling events.

An example is shown in FIG. 13, wherein as of symbol period 1, the sync adjust circuit is generating sync pulses at a sampling event at a particular point in time. In symbol period 2, a symbol pulse occurs at a later point in time, that is, it is retarded. The sync adjust circuit 500 will not immediately start issuing sync pulses at this new retarded point in time. Rather, the retarded symbol pulses must be detected for a predetermined number of consecutive symbol periods, set by the value of BWA or Z of the phase retard counter 530. In the example shown in FIG. 13, the BWA value is 4. Thus, the symbol pulse must be retarded for 4 consecutive symbol periods before the sync adjust circuit 500 will retard the sync pulse. In addition, the sync adjust circuit 500 retards it by a predetermined amount, such as one sampling event, set by the value of ARR.

Detecting the slope of the demodulated signal S(t) offers significant improvements particularly for communication devices operating in simulcast environments. The eye pattern for a 4 level FM signal received in a simulcast system even under strong signal conditions has an eye opening, that is not located at the center of the symbol. Consequently, conventional edge detection symbol synchronization would trigger on one of the first edges detected, and then would sample one-half a symbol period later, which may not correspond to center of the eye pattern. Using the eye pattern characteristic information to detect a symbol center by the symbol synchronizer according to the present invention makes it is possible to consistently detect symbol centers significantly more accurately than conventional edge symbol detection techniques, even for a signal received in a simulcast environment.

The symbol synchronizing method according to the present invention involves sampling the demodulated signal at a plurality of sampling events for each symbol period to generate first, second and third sample values, the first and third sample values being taken a times separated by one symbol period and the second sample value being taken at a time midway between the first sample value and third sample value; and determining eye pattern characteristic information based on the first, second and third sample values at each sampling event; and generating a synchronization pulse corresponding to a symbol center of the demodulated signal based on the eye pattern characteristic information. Furthermore, the step of generating eye pattern characteristic information at each sampling event comprises determining whether a slope of the demodulated signal is indicative of a symbol center and whether a magnitude of a difference between the first sample value and the third sample value is approximately equal to an integer multiple of a predetermined deviation value for the demodulated signal. The step of generating synchronization pulses involves generating a symbol detection signal comprising a symbol pulse for sampling events preliminarily determined to have eye pattern characteristic information consistent with a symbol center; filtering out symbol pulses in the symbol detection signal so as to output only one symbol pulse for each symbol period and advancing or retarding a synchronization pulse by a predetermined amount during a current symbol period when a symbol pulse is detected to be advanced or retarded, respectively, for a predetermined number of prior consecutive symbol periods.

The eye pattern detector 200 is versatile in that it can easily be used for multi-level symbol synchronization. Moreover, the eye pattern detector 200 shown in FIG. 1 is useful for both 2 level and 4 level symbol synchronization. In the situation wherein the eye pattern detector 200 is alternatively used for 4 level and 2 level symbol synchronization. For 2 level symbol synchronization, the comparators in the deviation separation circuit 220 used for comparing with 1×DEV and 2×DEV would be disabled without changing the predetermined deviation separation value of DEV determined from the 4 level signaling. This is particularly useful in communication devices that are required to detect data transmitted in a protocol where during a first period of time, the data is to be interpreted as 2 level symbols at a first rate, and at a second period of time, the data is to be interpreted as 4 level symbols at a second rate. This is the case in processing signals transmitted in accordance with Motorola's FLEX™ protocol technology.

In general, to process an M level demodulated signal, only the deviation separation circuit 220 would need to be modified to accommodate for the M−1 comparisons with integer multiples of the deviation value DEV, 1×DEV, ..., M1×DEV, as explained above. The circuits shown in FIGS. 4, 5 and 7–9 will process an M level demodulated signal without any further modification.

The eye pattern detector 200 is adjusted to specific receiver and system environments through the error tolerances. The eye pattern detector 200 can be implemented such that the error tolerances are replaced by the "±" boundaries. As an example, it has been determined for a 4 level signal where the frequency levels are ±4800 Hz and ±1600 Hz (and the deviation DEV is 3200 Hz), which is the case for the FLEX™ 6400 bits per second (BPS) signalling mode, that the performance benefits can be achieved when the "±" boundaries are set to values corresponding to the following frequencies: $err_1=err_2=err_5=err_6=436$ Hz and $err_3=err_4=872$ Hz.

In some instances, the circuits which perform the Boolean expression ABCD require scaled error tolerances in order to detect the 2×DEV and 3×DEV symbol transitions. The error tolerance $err_2$ is scaled by three coefficients for each of the three paths of equation B, such that there are three error tolerances $err_{2a}$, $err_{2b}$ and $err_{2c}$. As an example, for the 6400 BPS signalling mode FLEX™ signal described above, $err_{2a}=436$ Hz and $err_{2b}=err_{2c}=872$ Hz.

It has been determined that the majority of pulses produced by the Boolean expression CDEF are duplicated by the Boolean expression ABCD. Therefore, the eye pattern detector 200 can be reduced to only the circuitry necessary to perform the Boolean expression ABCD.

It has also been determined that a majority of the pulses result from the Boolean expression AB, whereas the CD expression generates pulses only a small percentage of the time. Consequently, the eye pattern detector 200 can be reduced to the circuitry necessary to perform the only Boolean expression AB, which corresponds to the slope computation circuit 210 and the deviation separation circuit 220. Through testing, it has been determined that the performance improvements afforded by the eye pattern detector 200 with its full complement of circuitry can be maintained using the reduced version comprising only the slope computation circuit 210 and the deviation separation circuit 220. Thus, for most applications, the eye pattern detector 200 may be embodied by the slope computation circuit 210, the deviation separation circuit 220, the AND gate 218 and the rising edge detector 300. In this reduced version, knowledge of the average AVG is not necessary for simplifying the design.

Figure 14:
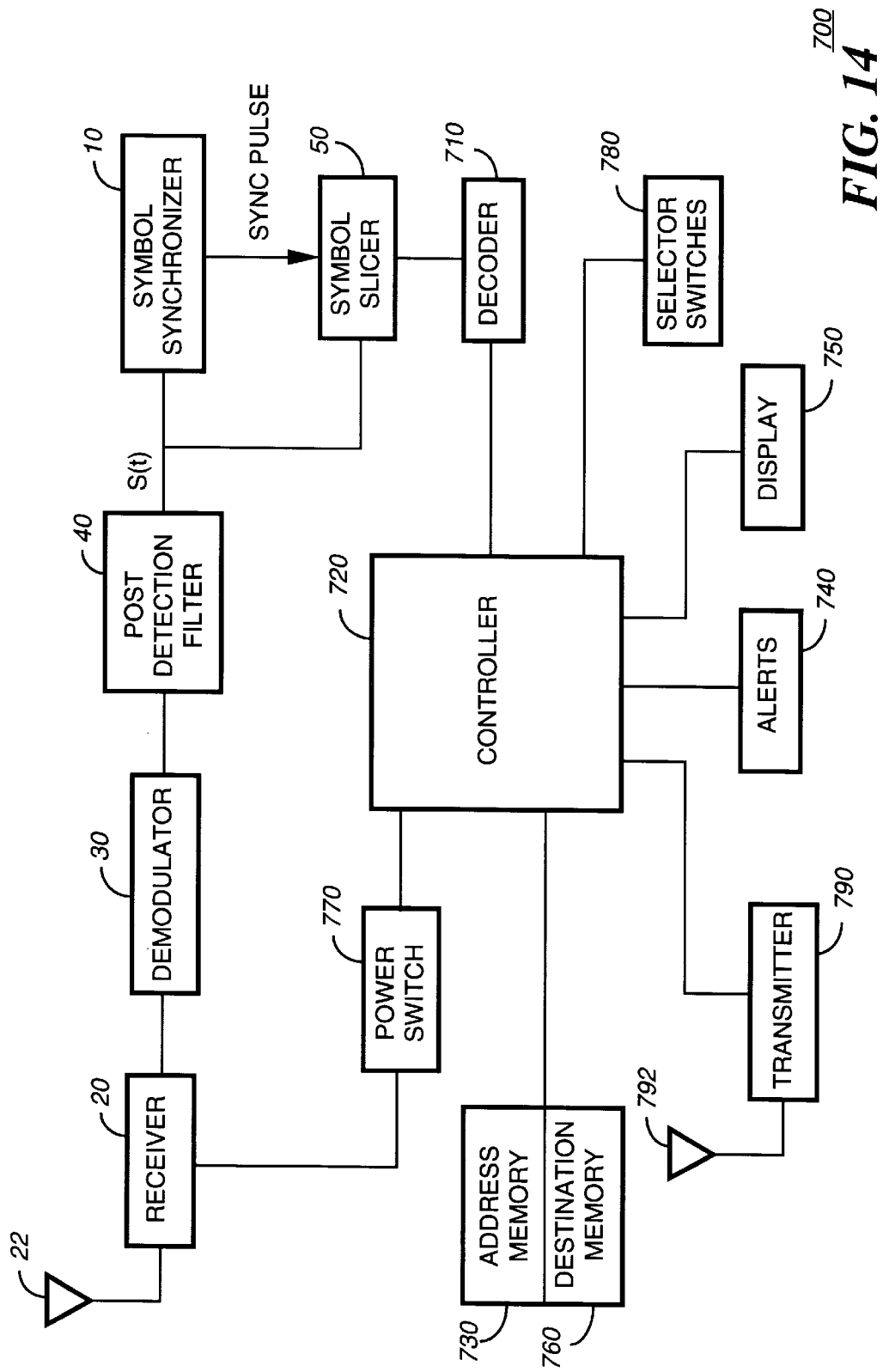
FIG. 14 is a block diagram of a selective call receiver comprising the symbol synchronizer according to the present invention.

FIG. 14 illustrates a selective call receiver (pager) 700 utilizing the symbol synchronizer 10 according to the present invention. The selective call receiver 700 comprises a receiver 20 for receiving RF signals detected by antenna 22. The received signal output by the receiver 20 is connected to the demodulator 30. The demodulator 30 outputs the demodulated signal to a post detection filter 40, which ultimately outputs a filtered demodulated signal. The symbol synchronizer 10 issues sync pulses to control when the symbol slicer samples the demodulated signal (at the center of a symbol) in order to compare the level of the demodulated signal (which may be digital or analog) with predetermined thresholds to output corresponding digital data, such as 2 level data ("0" or "1"), 4 level data ("00", "01", "11" or "10"), or in general M level data.

A decoder 710 is coupled to the symbol slicer and decodes the digital data in accordance with protocol rules established for example, by Motorola's FLEX™ paging protocol technology. For example, the decoder outputs corresponding address information, message information and/or control information. A controller 720 is connected to the decoder and is the control point for the selective call receiver 700. The controller 720 compares received address information with predetermined addresses stored in the address memory 730 in order to trigger one of the alerts 740 or to display a received text or graphics message on display 750. In addition, messages are stored in a destination memory 760. The controller 720 also is connected to a power switch 770 to shut down the receiver 20 during periods of time when the particular selective call receiver is not expected to receive information. User interface to the selective call receiver 700 is achieved through selector switches 780. The selective call receiver may have acknowledge-back or reverse channel transmitting capability, and accordingly comprises a transmitter 790 and transmitting antenna 792.

The above description is intended by way of example only and is not intended to limit the present invention in any way except as set forth in the following claims.

What is claimed is:

1. A symbol synchronizer for use in a communication device to synchronize to symbol centers in a demodulated signal, comprising:
   a sampling circuit receiving as input the demodulated signal and sampling the demodulated signal at a plurality of sampling events for each symbol period, and generating as output at each sampling event first, second and third sample values of the demodulated signal, the first sample value at a first sample time, the third sample value at a third sample time one symbol period prior to the first sample time and the second sample value at a second sample time halfway between the first sample time and the third sample time; and
   an eye pattern detector circuit connected to the sampling circuit and generating eye pattern characteristic information based on the first, second and third sample values for each sample event, and generating as output a symbol detection signal comprising a symbol pulse in response to detecting a symbol center based on the eye pattern characteristic information,
   wherein the eye pattern detector circuit determines a slope of the demodulated signal at each sampling event.

2. The symbol synchronizer of claim 1, and further comprising a synchronization adjust circuit coupled to the eye pattern detector circuit and generating a synchronization pulse at a particular instant of time during a current symbol period based on occurrences of a symbol pulse for prior symbol periods.

3. The symbol synchronizer of claim 2, wherein the synchronization adjust circuit advances or retards output of a synchronization pulse during a current symbol period in response to detecting an advancement or retardation, respectively, of symbol pulses detected within a predetermined number of prior consecutive symbol periods.

4. A communication device comprising the symbol synchronizer of claim 1, wherein the communication device further comprises:
   a receiver for receiving a transmitted radio frequency signal and generating a received signal;
   a demodulator for demodulating the received signal to generate the demodulated signal;
   a symbol slicer connected to the symbol synchronizer and to the demodulator and responsive to the symbol synchronizer to compare a level of the demodulated signal with predetermined thresholds in order to output corresponding digital data.

5. A selective call receiver comprising the communication device of claim 4, and further comprising a decoder coupled to the output of the symbol slicer and responsive to the digital data to generate corresponding address information or message information.

6. A symbol synchronizer for use in a communication device to synchronize to symbol centers in a demodulated signal, comprising:
   a sampling circuit receiving as input the demodulated signal and sampling the demodulated signal at a plurality of sampling events for each symbol period, and generating as output at each sampling event first, second and third sample values of the demodulated signal, the first sample value at a first sample time, the third sample value at a third sample time one symbol period prior to the first sample time and the second sample value at a second sample time between the first sample time and the third sample time;
   an eye pattern detector circuit connected to the sampling circuit and generating eye pattern characteristic information based on the first, second and third sample values for each sample event, and generating as output a symbol detection signal comprising a symbol pulse in response to detecting a symbol center based on the eye pattern characteristic information; and
   a synchronization noise mask circuit connected to the eye pattern detector, the synchronization noise mask circuit masking symbol pulses in the symbol detection signal that occur during a predetermined period of time after a first symbol pulse is detected in each symbol period.

7. The symbol synchronizer of claim 6, and further comprising a synchronization adjust circuit connected to the synchronization noise mask circuit, the synchronization adjust circuit being responsive to a symbol pulse output by the synchronization noise mask circuit to generate a synchronization pulse at a particular instant of time during a current symbol period based on occurrences of symbol pulses for prior symbol periods.

8. A symbol synchronizer for use in a communication device to synchronize to symbol centers in a demodulated signal, comprising:
   a sampling circuit receiving as input the demodulated signal and sampling the demodulated signal at a plurality of sampling events for each symbol period, and generating as output at each sampling event first, second and third sample values of the demodulated signal, the first sample value at a first sample time, the third sample value at a third sample time one symbol period prior to the first sample time and the second sample value at a second sample time between the first sample time and the third sample time;
   an eye pattern detector circuit connected to the sampling circuit and generating eye pattern characteristic information based on the first, second and third sample values for each sample event, and generating as output a symbol detection signal comprising a symbol pulse in response to detecting a symbol center based on the eye pattern characteristic information; and
   a synchronization adjust circuit coupled to the eye pattern detector circuit and generating a synchronization pulse at a particular instant of time during a current symbol period based on occurrences of a symbol pulse for prior symbol periods, wherein the synchronization adjust circuit advances or retards output of a synchronization pulse during a current symbol period in response to detecting an advancement or retardation, respectively, of symbol pulses detected within a predetermined number of prior consecutive symbol periods, and
   wherein in the synchronization adjust circuit advances or retards a synchronization pulse by an adjustable predetermined amount.

9. A symbol synchronizer for use in a communication device to synchronize to symbol centers in a demodulated signal, comprising:
   a sampling circuit receiving as input the demodulated signal and sampling the demodulated signal at a plurality of sampling events for each symbol period, and generating as output at each sampling event first, second and third sample values of the demodulated signal, the first sample value at a first sample time, the third sample value at a third sample time one symbol period prior to the first sample time and the second sample value at a second sample time between the first sample time and the third sample time;
   an eye pattern detector circuit connected to the sampling circuit and generating eye pattern characteristic information based on the first, second and third sample values for each sample event, and generating as output a symbol detection signal comprising a symbol pulse in response to detecting a symbol center based on the eye pattern characteristic information; and
   a filter circuit connected to the eye pattern detector, the filter circuit filtering symbol pulses that occur during a single symbol period so as to output one symbol pulse during each symbol period.

10. The symbol synchronizer of claim 9, and further comprising a synchronization adjust circuit connected to the filter circuit, the synchronization adjust circuit receiving as input symbol pulses output by the filter circuit and generating as output a synchronization pulse.

11. The symbol synchronizer of claim 10, wherein the synchronization adjust circuit changes a phase of a synchronization pulse by an adjustable predetermined amount in a current symbol period in response to detecting a change in phase of symbol pulses over an adjustable predetermined number of prior symbol periods.

12. A symbol synchronizer for use in a communication device to synchronize to symbol centers in a demodulated signal, comprising:
   a sampling circuit receiving as input the demodulated signal and sampling the demodulated signal at a plurality of sampling events for each symbol period, and generating as output at each sampling event first, second and third sample values of the demodulated signal, the first sample value at a first sample time, the third sample value at a third sample time one symbol period prior to the first sample time and the second sample value at a second sample time between the first sample time and the third sample time;
   an eye pattern detector circuit connected to the sampling circuit and generating eye pattern characteristic information based on the first, second and third sample values for each sample event, and generating as output a symbol detection signal comprising a symbol pulse in response to detecting a symbol center based on the eye pattern characteristic information, wherein the sampling circuit generates the second sample value at a second sample time midway between the first sample time and the third sample time, and wherein the eye pattern detector circuit determines a slope of the demodulated signal at each sampling event by comparing the second sample value with an average of the first sample value and the third sample value.

13. A symbol synchronizer for use in a communication device to synchronize to symbol centers in a demodulated signal, comprising:

a sampling circuit receiving as input the demodulated signal and sampling the demodulated signal at a plurality of sampling events for each symbol period, and generating as output at each sampling event first, second and third sample values of the demodulated signal, the first sample value at a first sample time, the third sample value at a third sample time one symbol period prior to the first sample time and the second sample value at a second sample time between the first sample time and the third sample time;

an eye pattern detector circuit connected to the sampling circuit and generating eye pattern characteristic information based on the first, second and third sample values for each sample event, and generating as output a symbol detection signal comprising a symbol pulse in response to detecting a symbol center based on the eye pattern characteristic information, wherein the eye pattern detector circuit comprises:

a slope computation circuit connected to the sampling circuit, the slope computation circuit computing an average of the first sample value and the third sample value and comparing the average with the second sample value to determine whether the average is substantially equal to the second sample value, and generating an output signal representative thereof;

a deviation separation circuit connected to the sampling circuit, the deviation separation circuit computing a difference between the first sample value and the third sample value and determining whether the difference is approximately equal to an integer multiple of a predetermined deviation value, wherein a value of the integer is between one and a maximum value related to the number of possible level transitions in the demodulated signal, the deviation separation circuit generating an output signal representative thereof; and a gate coupled to the slope computation circuit and the deviation separation circuit and responsive to the output signals of both the slope computation circuit and deviation separation circuit to generate an output signal representative thereof.

14. The symbol synchronizer of claim 13, wherein the eye pattern detector circuit further comprises a rising edge detector coupled to the output of the gate and generating the symbol pulse in the symbol detection signal in response to detecting a rising edge in the output signal of the gate.

15. A symbol synchronizer for use in a communication device to synchronize to symbol centers in a demodulated signal, comprising:

a sampling circuit receiving as input the demodulated signal and sampling the demodulated signal at a plurality of sampling events for each symbol period, and generating as output at each sampling event first, second and third sample values of the demodulated signal, the first sample value at a first sample time, the third sample value at a third sample time one symbol period prior to the first sample time and the second sample value at a second sample time between the first sample time and the third sample time;

an eye pattern detector circuit connected to the sampling circuit and generating eye pattern characteristic information based on the first, second and third sample values for each sample event, and generating as output a symbol detection signal comprising a symbol pulse in response to detecting a symbol center based on the eye pattern characteristic information, wherein the eye pattern detector circuit comprises:

a slope computation circuit connected to the sampling circuit, the slope computation circuit computing an average of the first sample value and third sample value and comparing the average with the second sample value to determine whether the average is substantially equal to the second sample value, and generating an output signal representative thereof;

a deviation separation circuit connected to the sampling circuit, the deviation separation circuit computing a difference between the first sample value and the third sample value and determining whether the difference is approximately equal to an integer multiple of a predetermined deviation value, wherein a value of the integer is equal to one and integers up to a maximum value related to the number of possible level transitions in the demodulated signal, the deviation separation circuit generating an output signal representative thereof;

an equal-magnitude opposite-polarity circuit connected to the sampling circuit, the equal-magnitude opposite-polarity circuit comparing the first sample value and the third sample value to detect if the first sample value and third sample value are approximately equal in magnitude and opposite in polarity with respect to an average value of the demodulated signal, and generating an output signal representative thereof;

a mid-sample centered circuit connected to the sampling circuit, the mid-sample centered circuit determine whether the magnitude of the second sample value, with respect to the average value, is within a predetermined range of the deviation value, and generating an output signal representative thereof;

an off-center separation circuit connected to the sampling circuit, the off-center comparison circuit detecting when a magnitude of the first sample value and a magnitude of the third sample value, with respect to the average value, are beyond a predetermined range of one-half of the predetermined deviation value, and generating an output signal representative thereof; and a decision logic circuit coupled and responsive to output signals of the slope computation circuit, deviation separation circuit, equal-magnitude opposite-polarity circuit, mid-sample centered circuit, and off-center separation circuit, to detect a combination of individual eye pattern characteristics indicative of a symbol center for each sampling event, and generating an output signal representative thereof.

16. The symbol synchronizer of claim 15, wherein the decision logic circuit comprises:

a first gate coupled to the slope computation circuit and the deviation separation circuit and responsive to the output signals of both the slope computation circuit and deviation separation circuit to generate as output a pulse;

a second gate coupled to the equal-magnitude opposite-polarity circuit and to the mid-sample centered circuit and generating as output a pulse in response to the output signals of both the equal-magnitude opposite-polarity circuit and the mid-sample centered circuit;

a third gate coupled to the first gate and to the second gate and generating as output a pulse in response to either a pulse output by the first gate or a pulse output by the second gate; and a fourth gate connected to the off-center separation circuit and to the third gate, the fourth gate generating as output a pulse in response to the output signal of the off-center separation circuit and pulse output by the third gate.

17. A symbol synchronizer for use in a communication device to synchronize to symbol centers in a demodulated signal, comprising:

sampling means for sampling the demodulated signal at a plurality of sampling events for each symbol period, and generating as output at each sampling event three sample values, two of which are separated by one symbol period and one of which is taken at an instant in time therebetween;

eye pattern detecting means connected to the sampling means and generating eye pattern characteristic information based on the three sample values for each sampling event, and generating as output a symbol detection signal comprising a symbol pulse in response to detecting a symbol center based on the eye pattern characteristic information; and filter means connected to the eye pattern detector for filtering the symbol detection signal to output one symbol pulse in the symbol detection signal for each symbol period.

18. The symbol synchronizer of claim 17, wherein the filter means comprises a noise mask circuit which masks symbol pulses in the symbol detection signal that occur during a predetermined period of time after a first symbol pulse in each symbol period.

19. A symbol synchronizer for use in a communication device to synchronize to symbol centers in a demodulated signal, comprising:

sampling means for sampling the demodulated signal at a plurality of sampling events for each symbol period, and generating as output at each sampling event three sample values, two of which are separated by one symbol period and one of which is taken at an instant in time halfway therebetween; and eye pattern detecting means connected to the sampling means for generating eye pattern characteristic information based on the three sample values for each sampling event, and for generating as output a symbol detection signal comprising a symbol pulse in response to detecting a symbol center based on the eye pattern characteristic information, wherein the eye pattern detecting means determines a slope of the demodulated signal at each sampling event.

20. The symbol synchronizer of claim 19, and further comprising:

synchronization adjusting means coupled to the eye pattern detecting means, the synchronization adjusting means generating a synchronization pulse during each symbol period at a particular instant of time during based on occurrences of symbol pulses for prior symbol periods.

21. The symbol synchronizer of claim 20, wherein the synchronization adjusting means advances or retards output of a synchronization pulse in response to detecting an advancement or retardation, respectively, of symbol pulses detected for a predetermined number of prior consecutive symbol periods.

22. The symbol synchronizer of claim 21, wherein the synchronization adjusting means advances or retards a synchronization pulse by an adjustable predetermined amount.

23. A method for synchronizing to symbol centers of a demodulated signal comprising steps of:

sampling the demodulated signal at a plurality of sampling events for each symbol period to generate first, second and third sample values, the first and third sample values being taken a times separated by one symbol period and the second sample value being taken at a time halfway between the first sample value and third sample value;

determining eye pattern characteristic information based on the first, second and third sample values at each sampling event, including at least one of 1) a slope and 2) an integer that represents a multiplicity of a predetermined deviation separation value; and generating a synchronization pulse corresponding to a symbol center of the demodulated signal based on the eye pattern characteristic information.

24. A method for synchronizing to symbol centers of a demodulated signal comprising steps of:

sampling the demodulated signal at a plurality of sampling events for each symbol period to generate first, second and third sample values, the first and third sample values being taken a times separated by one symbol period and the second sample value being taken at a time between the first sample value and third sample value;

determining eye pattern characteristic information based on the first, second and third sample values at each sampling event; and generating a synchronization pulse corresponding to a symbol center of the demodulated signal based on the eye pattern characteristic information, wherein the step of determining eye pattern characteristic information at each sampling event comprises determining whether a slope of the demodulated signal is indicative of a symbol center and whether a magnitude of a difference between the first sample value and third sample value is approximately equal to an integer multiple of a predetermined deviation value for the demodulated signal.

25. A method for synchronizing to symbol centers of a demodulated signal comprising steps of:

sampling the demodulated signal at a plurality of sampling events for each symbol period to generate first, second and third sample values, the first and third sample values being taken a times separated by one symbol period and the second sample value being taken at a time between the first sample value and third sample value;

determining eye pattern characteristic information based on the first, second and third sample values at each sampling event; and generating a synchronization pulse corresponding to a symbol center of the demodulated signal based on the eye pattern characteristic information, wherein the step of generating a synchronization pulse comprises:

generating a symbol detection signal comprising symbol pulses for sampling events determined to have eye pattern characteristic information consistent with a symbol center; and filtering out symbol pulses in the symbol detection signal so as to output only one symbol pulse for each symbol period.

26. The method of claim 25, wherein the step of generating a synchronization pulse further comprises advancing or retarding a synchronization pulse by a predetermined amount during a current symbol period when a symbol pulse is detected to be advanced or retarded, respectively, for a predetermined number of prior consecutive symbol periods.

27. A symbol synchronizer for use in a communication device to synchronize to symbol centers in a demodulated signal, comprising:

a sampling circuit receiving as input the demodulated signal and sampling the demodulated signal at a plurality of sampling events for each symbol period, and generating as output at each sampling event first, second and third sample values of the demodulated signal, the first sample value at a first sample time, the third sample value at a third sample time one symbol period prior to the first sample time and the second sample value at a second sample time halfway between the first sample time and the third sample time; and an eye pattern detector circuit connected to the sampling circuit and generating eye pattern characteristic information based on the first, second and third sample values for each sample event, and generating as output a symbol detection signal comprising a symbol pulse in response to detecting a symbol center based on the eye pattern characteristic information, and a deviation separation circuit connected to the sampling circuit, the deviation separation circuit computing a difference between the first sample value and the third sample value and determining whether the difference is approximately equal to an integer multiple of a predetermined deviation value.

* * * * *